(12) United States Patent
Park

(10) Patent No.: US 6,456,020 B1
(45) Date of Patent: Sep. 24, 2002

(54) CIRCUIT FOR STABILIZING A SCREEN VOLTAGE OF A VIDEO DISPLAY APPARATUS

(75) Inventor: Kil-Soo Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/390,633

(22) Filed: Sep. 7, 1999

(30) Foreign Application Priority Data

Sep. 10, 1998 (KR) .............................. 98/37392

(51) Int. Cl.$^7$ ................................ H01J 29/70
(52) U.S. Cl. ...................... 315/411; 315/371
(58) Field of Search ................. 345/211, 212; 315/411, 371

(56) References Cited

U.S. PATENT DOCUMENTS 5,266,871 A  * 11/1993 Haferl ..................... 315/411
5,796,218 A  *  8/1998 Kwon et al. ............. 315/411
5,982,641 A  * 11/1999 Jackson ................... 363/21

FOREIGN PATENT DOCUMENTS

JP         403052453 A  *  3/1991

* cited by examiner

Primary Examiner—Richard Hjerpe
Assistant Examiner—Kevin M. Nguyen
(74) Attorney, Agent, or Firm—Robert E. Bushnell, Esq.

(57) ABSTRACT

A circuit for stabilizing a screen voltage of the video display apparatus is capable of supplying a uniform screen voltage to the video display apparatus even though a voltage level of an output voltage from a flyback transformer is changed. A horizontal output section generates a horizontal output voltage in response to a horizontal driving signal. A flyback transformer supplies a first power source to a primary winding according to the horizontal output voltage, induces a voltage in a secondary winding thereof based on a turns-ratio, and induces a voltage in a tertiary winding thereof according to the voltage induced in the secondary winding. A screen voltage generator receives a second power source and a pulse width modulation signal, controls the voltage induced in the tertiary winding of the flyback transformer to maintain a uniform voltage level by selectively outputting the second power source in response to the pulse width modulation signal, and outputs the voltage induced in the tertiary winding as a screen voltage. Accordingly, the invention is able to prevent the brightness and quality of the screen of the video display apparatus from deteriorating.

20 Claims, 3 Drawing Sheets

CIRCUIT FOR STABILIZING A SCREEN VOLTAGE OF A VIDEO DISPLAY APPARATUS

CLAIM OF PRIORITY

This application makes reference to, incorporates the same herein, and claims all benefits accruing under 35 U.S.C. §119 from my application CIRCUIT FOR STABILIZING A SCREEN VOLTAGE OF A VIDEO DISPLAY APPARATUS filed with the Korean Industrial Property Office on Sep. 10, 1998 and there duly assigned Ser. No. 37392/1998.

BACKGROUND OF THE INVENTION

1. Field of the Invention

The present invention relates to stabilizing a screen voltage of a video display apparatus, and more particularly, to a circuit for stabilizing a screen voltage of the video display apparatus capable of supplying a uniform screen voltage to the video display apparatus even though a voltage level of an output voltage from a flyback transformer is changed.

2. Description of the Related Art

In general, a video display apparatus such as a monitor of a computer system, responsive to a sync signal, displays an externally input video signal on a screen by colliding an electron beam corresponding to the video signal with luminescent materials arranged on a fluorescent screen of a cathode-ray tube.

To display the video signal on the screen as described above, the video display apparatus has to sequentially execute operations which control, accelerate and focus the electron beam corresponding to the video signal with a plurality of grid electrodes arranged in the cathode-ray tube.

The plurality of grid electrodes includes a first grid electrode for controlling an emission amount of an electron beam, a second grid electrode for controlling a moving velocity of the electron beam, a third grid electrode for focusing the electron beam, and a fourth grid electrode for controlling the diffusion of the electron beam according to the movement of the electron beam.

A voltage supplied to the second, third and fourth grid electrodes is generated by a flyback transformer. Accordingly, the brightness and quality of the screen are determined by the stability of the voltage which is respectively supplied to the second, third and fourth grid electrodes by the flyback transformer.

To stabilize the voltage which is respectively supplied to the second, third and fourth grid electrodes, a peak value of a flyback pulse inputted to a primary winding of the flyback transformer has to be maintained at a uniform voltage level.

However, the peak value of the flyback pulse is often changed according to the change of a load of a voltage induced in a secondary winding of the flyback transformer. Consequently, a level of the voltage induced in the secondary winding of the flyback transformer is changed.

Accordingly, since the voltage which is respectively supplied to the second, third and fourth grid electrodes by the flyback transformer—particularly, a voltage level of a screen voltage supplied to the second grid electrode—is changed, the quality of the screen of the video display apparatus deteriorates.

SUMMARY OF THE INVENTION

Therefore, it is an object of the present invention to provide a circuit for stabilizing a screen voltage of a video display apparatus capable of supplying a uniform screen voltage to the video display apparatus even though a voltage level of an output voltage from a flyback transformer is changed.

In order to achieve the above object, the present invention provides a circuit for stabilizing a screen voltage of a video display apparatus, which comprises: a horizontal output generator for generating a horizontal output voltage in response to a horizontal driving signal; a flyback transformer for supplying a first power source to a primary winding according to the horizontal driving signal, for inducing a voltage in a secondary winding thereof based on a turns-ratio, and for inducing a voltage in a tertiary winding thereof according to the voltage induced in the secondary winding based on the turns-ratio; and a screen voltage generator for receiving a second power source and a pulse width modulation signal, for controlling the voltage induced in the tertiary winding of said flyback transformer to maintain a uniform voltage level by selectively outputting the second power source in response to the pulse width modulation signal, and for outputting the voltage induced in the tertiary winding as a screen voltage.

According to the present invention, the screen voltage supplied to the second grid electrode from the flyback transformer is generated by the voltage induced in the tertiary winding thereof, Also, the voltage induced in the tertiary winding of the flyback transformer maintains a uniform voltage level by controlling the screen voltage generator even though the high voltage and the voltage induced in the tertiary winding are changed. Accordingly, the invention is able to prevent the brightness and quality of the screen of the video display apparatus from deteriorating.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

A description will be given below in detail with reference to the accompanying drawings to a configuration and an operation of the circuit for protecting the surge voltage of the video display apparatus according to an embodiment of the present invention.

Figure 1:
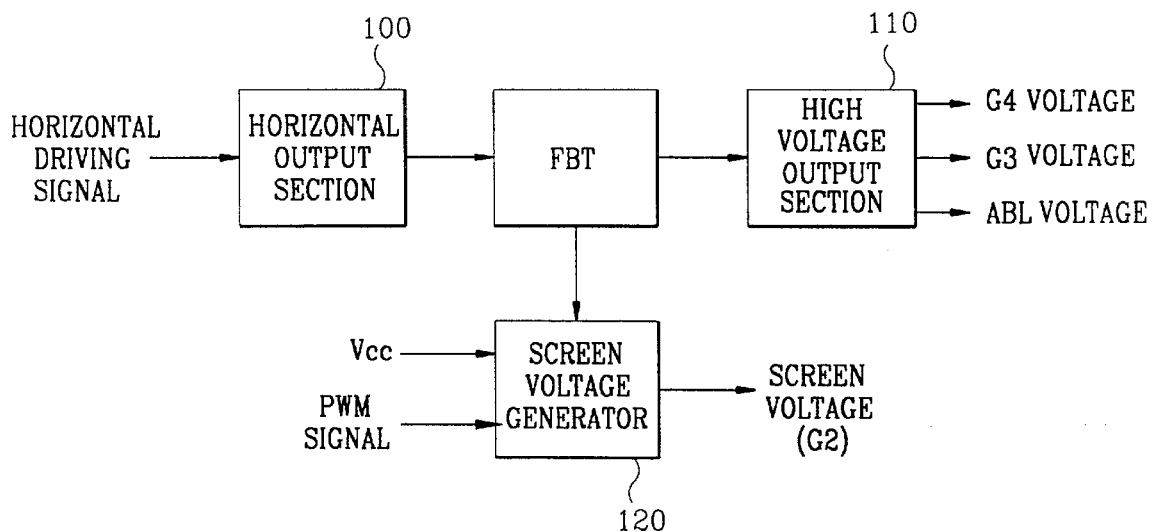
FIG. 1 is a block diagram showing the configuration of a circuit for stabilizing a screen voltage of a video display apparatus according to an embodiment of the present invention.

FIG. 1 is a block diagram showing the configuration of a circuit for stabilizing a screen voltage of a video display apparatus according to an embodiment of the present invention.

Referring to FIG. 1, the circuit for stabilizing the screen voltage of the video display apparatus comprises: a horizontal output section 100 for outputting a horizontal output voltage in response to an externally inputted horizontal driving signal; a flyback transformer FBT for supplying a first power source B+ to a primary winding L1 (FIG. 3) according to the horizontal driving signal, for inducing a voltage in secondary windings L2, L3 and L4 based on a turns-ratio thereof, and for inducing a voltage in a tertiary winding L5 according to the voltage induced in the secondary winding based on the turns-ratio thereof; a high voltage output section 110 for supplying a focusing voltage G3 and a high voltage G4 to third and fourth grid electrodes (not shown), respectively, according to the voltage induced in the secondary windings L2, L3 and L4 of the flyback transformer FBT; and a screen voltage generator 120 for controlling the voltage induced in the tertiary winding L5 of the flyback transformer FBT to maintain a uniform voltage level in response to a second power source Vcc and an externally inputted pulse width modulation signal PWM, and for supplying the voltage induced in the tertiary winding L5 to a second grid electrode (not shown) as a screen voltage G2.

Figure 2:
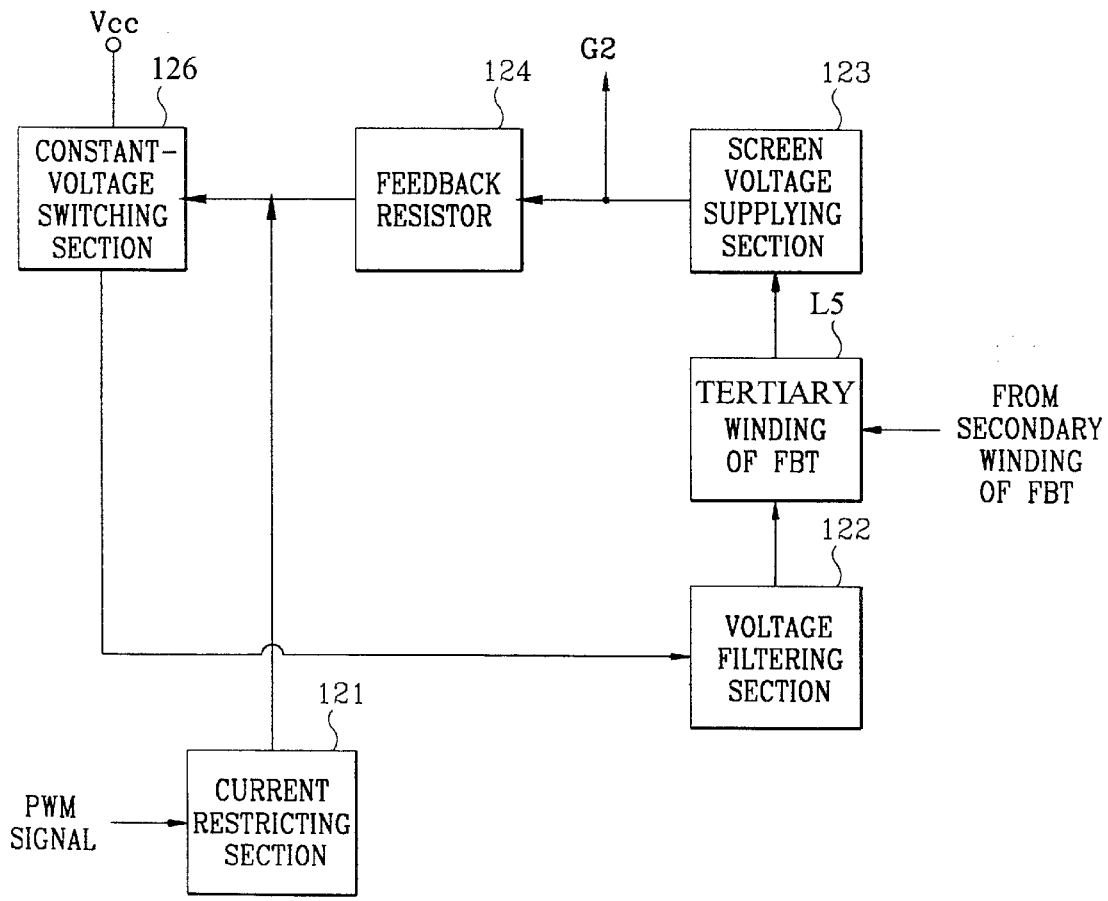
FIG. 2 is a block diagram showing the configuration of a screen voltage generator of the circuit for stabilizing a screen voltage of a video display apparatus according to the embodiment of the present invention shown in FIG. 1.
Figure 3:
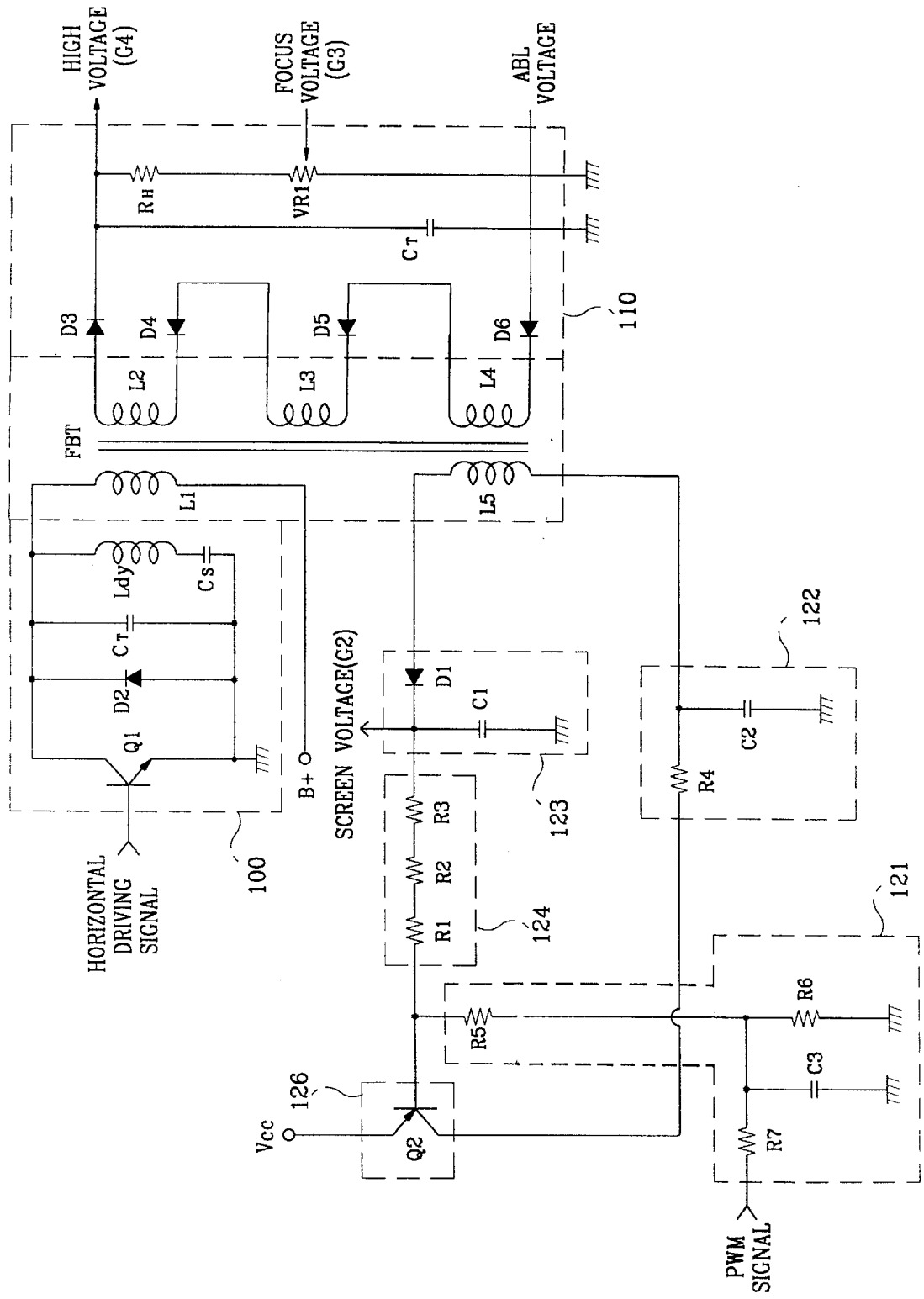
FIG. 3 is a circuit diagram showing the configuration of the circuit for stabilizing a screen voltage of the video display apparatus according to the embodiment of the present invention shown in FIG. 1.

FIG. 2 is a block diagram showing the configuration of a screen voltage generator of the circuit for stabilizing a screen voltage of a video display apparatus according to the embodiment of the present invention shown in FIG. 1, and FIG. 3 is a circuit diagram showing the configuration of the circuit for stabilizing a screen voltage of the video display apparatus according to the embodiment of the present invention shown in FIG. 1.

Referring to FIG. 2, the screen voltage generator 120 comprises: a screen voltage supplying section 123 for rectifying the voltage induced in the tertiary winding L5 of the flyback transformer FBT to output a rectified voltage as the screen voltage G2; a feedback resistor 124 for controlling the screen voltage G2 outputted from the screen voltage supplying section 123 to maintain the uniform voltage level; a current restricting section 121 for restricting an output voltage outputted from feedback resistor 124 in response to the pulse width modulation signal PWM; a constant-voltage switching section 126 for receiving a second power source Vcc, and for selectively outputting the second power source Vcc in response to the output voltage, of which the current is restricted by current restricting section 121, from feedback resistor 124; and a voltage filtering section 122 for filtering a negative voltage of an output voltage from the constant-voltage switching section 126 to output a filtered voltage to the tertiary winding L5 of the flyback transformer FBT.

Referring to FIG. 3, the screen voltage supplying section 123 comprises: a first diode D1 having an anode connected to one end of the tertiary winding L5 of the flyback transformer FBT, and having a cathode connected to the feedback resistor 124; and a first capacitor C1 having one end connected between the cathode of the first diode D1 and the feedback resistor 124, and having another end grounded.

The constant-voltage switching section 126 comprises a PNP transistor Q2 having an emitter which receives the second power source Vcc, a collector connected to the voltage filtering section 122, and a base connected to the feedback resistor 124.

The feedback resistor 124 comprises first, second and third resistors R1, R2 and R3, respectively, connected in series between the screen voltage supplying section 123 and the constant voltage switching section 126.

The voltage filtering section 122 comprises a fourth resistor R4 having one end connected to the collector of the PNP transistor Q2 and another end connected to another end of the tertiary winding L5 of the flyback transformer FBT, and a second capacitor C2 having one end connected between the fourth resistor R4 and the other end of the tertiary winding L5, and another end grounded.

In addition, the current restricting section 121 comprises: a fifth resistor R5 having one end connected between the first resistor R1 of the feedback resistor 124 and the base of the PNP transistor Q2; a sixth resistor R6 having one end connected to the other end of the fifth resistor R5 and another end grounded; a seventh resistor R7 having one end connected between the fifth resistor R5 and the sixth resistor R6, and another end receiving the pulse width modulation signal PWM; and a third capacitor C3 having one end connected to one end of the seventh resistor R7 and another end grounded.

The horizontal output section 100 comprises an NPN transistor Q1 for amplifying the horizontal driving signal, a capacitor $C_T$ for repeatedly executing charging and discharging operations in accordance with a switching operation of the NPN transistor Q1 so as to generate a sawtooth wave signal, a horizontal deflecting coil Ldy for generating a deflecting force to deflect an electron beam in a horizontal direction according to the sawtooth wave signal, and a capacitor $C_s$ for compensating the sawtooth wave signal.

The operation of the circuit for stabilizing the screen voltage of the video display apparatus according to the embodiment of the present invention is as follows.

Figure 4:
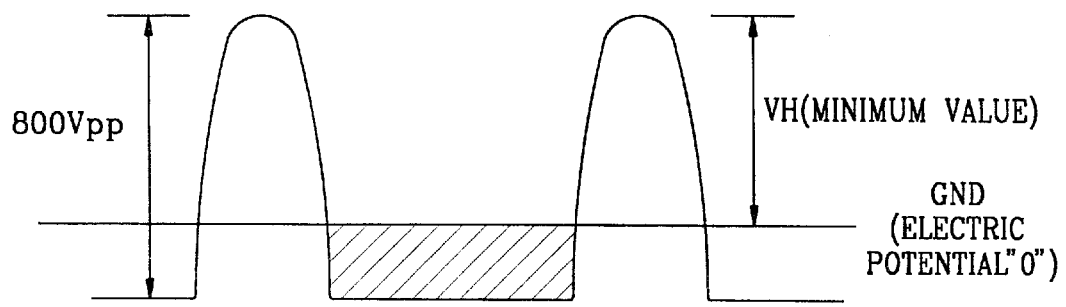
FIG. 4 and FIG. 5 are waveform views showing the output voltage of a constant-voltage switching section of the circuit for stabilizing a screen voltage of a video display apparatus according to the embodiment of the present invention shown in FIG. 1.
Figure 5:
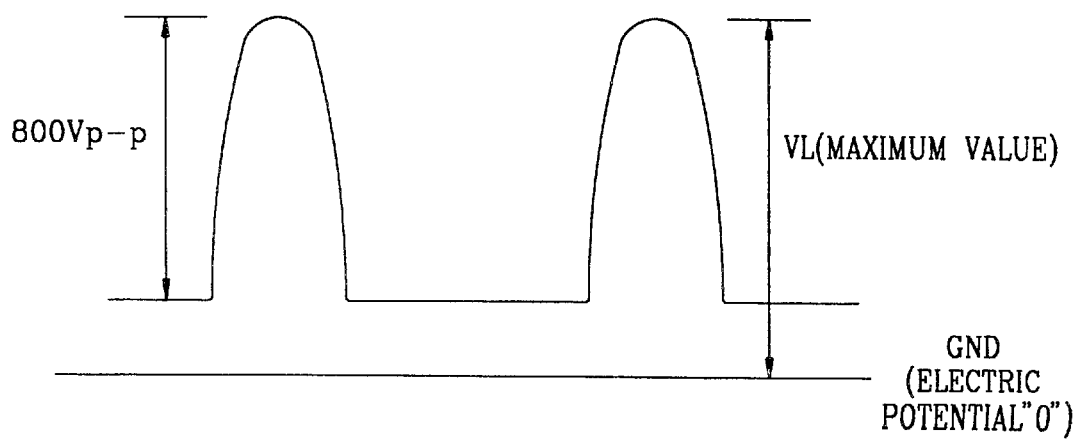

FIG. 4 is a view showing waveforms of an output voltage outputted from the collector electrode of the PNP transistor Q2 when the voltage level of the pulse width modulation signal PWM is at a high level, and FIG. 5 is a view showing waveforms of an output voltage outputted from the collector electrode of the PNP transistor Q2 when the voltage level of pulse width modulation signal PWM is at a low level.

Firstly, when the NPN transistor Q1 of the horizontal output section 100 is turned-on in response to the horizontal driving signal, a first-voltage according to first power source B+ is supplied to the primary winding L1 of flyback transformer FBT.

When a second voltage according to the turns-ratio is induced in the secondary windings L2, L3 and L4 of the flyback transformer FBT by means of the first voltage supplied to the primary winding L1 of the flyback transformer FBT, the high voltage output section 110 supplies focusing voltage G3 and high voltage G4 to the third and the fourth grid electrodes (not shown), respectively.

Elements D3, D4, D5 and D6 are diodes for preventing a reverse current, resistor $R_H$ is a high voltage resistor, and a resistor VR1 is a variable resistor for the focusing voltage.

A third voltage is induced in the tertiary winding L5 of the flyback transformer FBT by the second voltage induced in the secondary windings L2, L3 and L4 of flyback transformer FBT, and the third voltage is used as screen voltage G2.

Generally, the screen voltage G2 is supplied to the screen at about 400 to 700 volts, and an amplitude of the third voltage induced in the tertiary winding L5 of flyback transformer FBT is maintained at about 800 Vp-p.

The third voltage is rectified by means of the first diode D1 and first capacitor C1 of the screen voltage supplying section 123 and is supplied to the second grid electrode (not shown).

The pulse width modulation signal PWM outputted from a microcomputer (not shown) is voltage divided by means of the sixth and seventh resistors R6 and R7 and is smoothed by means of the third capacitor C3. Also, the pulse width modulation signal PWM restricts the current supplied to the base electrode of the PNP transistor Q2 through the fifth resistor R5.

As shown in, FIG. 4, when the pulse width modulation signal PWM of a high level corresponding to 5 volts is supplied to the current restricting section 121, the PNP transistor Q2 is turned-off and the negative voltage of the collector electrode thereof is maintained at about 150 to 200 volts. Accordingly, since the level of voltage rectified by first diode D1 and first capacitor C1 goes down, the screen voltage G2 falls.

On the contrary, as shown in FIG. 5, when the pulse width modulation signal PWM of a low level corresponding to 0 volt is supplied to the current restricting section 121, the PNP transistor Q2 is turned-on and the second power source Vcc from the collector electrode thereof is supplied to the voltage filtering section 122. Accordingly, since the level of the voltage rectified by first diode D1 and first capacitor C1 goes up, the screen voltage G2 rises.

That is, as shown in FIGS. 4 and 5, the screen voltage G2 can be set to a desired voltage level according to the base current of the PNP transistor Q2 controlled by the pulse width modulation signal PWM.

The set screen voltage G2 is changed by the change of the voltage level of the third voltage of flyback transformer FBT and first power source B+.

That is, when the voltage level of the screen voltage G2 rectified by first diode D1 and first capacitor C1 rises by means of the change of a load, the current detected by the first, second and third resistor R1, R2 and R3, respectively, having the high impedance of feedback resistor 124 increases the base current of the PNP transistor Q2.

Accordingly, since the PNP transistor Q2 maintains a turned-offstate and the output voltage from the collector of the PNP transistor Q2 supplied to the voltage filtering section 122 has a negative electrical potential, the voltage level of the screen voltage G2, which is increased according to the change of the load, falls.

On the contrary, when the voltage level of the screen voltage G2 rectified by the first diode D1 and first capacitor C1 is dropped by means of the change of a load, the current detected by the first, second and third resistor R1, R2 and R3, respectively, having the high impedance of feedback resistor 124 decreases the base current of PNP-type transistor Q2.

Accordingly, since the PNP transistor Q2 maintains a turned-on state and the second power source Vcc is outputted from the collector electrode of the PNP transistor Q2, and since the second power source Vcc is supplied to the voltage filtering section 122, the voltage level of the screen voltage G2, which is decreased according to the change of the load, rises.

In the circuit for stabilizing screen voltage of the video display apparatus according to the present invention described above, the screen voltage supplied to the second grid electrode from the flyback transformer is generated by means of the voltage induced in the tertiary winding thereof.

Also, the voltage induced in the tertiary winding of the flyback transformer maintains a uniform voltage level by controlling the screen voltage generating section even though the high voltage and the voltage induced in the tertiary winding are changed.

Accordingly, the invention is able to prevent the brightness and quality of the screen of the video display apparatus from deteriorating.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A circuit for stabilizing a screen voltage of a video display apparatus, said apparatus comprising:

a horizontal output generator for generating a horizontal output voltage in response to a horizontal driving signal;

a flyback transformer having a primary winding to which a first power source is applied according to the horizontal driving signal, for inducing a voltage in a secondary winding of said flyback transformer based on a turns-ratio, and for inducing a voltage in a tertiary winding of said flyback transformer according to the voltage induced in the secondary winding based on the turns-ratio; and a screen voltage generator for receiving a second power source and a pulse width modulation signal, for controlling the voltage induced in the tertiary winding of said flyback transformer to maintain a uniform voltage level by selectively outputting the second power source in response to the pulse width modulation signal, and for outputting the voltage induced in the tertiary winding as a screen voltage;

said screen voltage generator comprising a screen voltage supply circuit for rectifying the voltage induced in the tertiary winding of said flyback transformer to output the voltage induced in the tertiary winding as the screen voltage, and a feedback resistance for controlling the screen voltage outputted from said screen voltage supply circuit to maintain the uniform voltage level; and said screen voltage supply circuit comprising a diode having an anode connected to one end of the tertiary winding of said flyback transformer and a cathode connected to said feedback resistance, and a capacitor having one end connected between the cathode of said diode and said feedback resistance, and another end ground.

2. The circuit as claimed in claim 1, wherein said screen voltage generator comprises a plurality of elements connected in series between opposite ends of said tertiary winding so as to form a feedback loop between the opposite ends of said tertiary winding.

3. A circuit for stabilizing a screen voltage of a video display apparatus, said apparatus comprising:

a horizontal output generator for generating a horizontal output voltage in response to a horizontal driving signal;

a flyback transformer having a primary winding to which a first power source is applied according to the horizontal driving signal, for inducing a voltage in a secondary winding of said flyback transformer based on a turns-ratio, and for inducing a voltage in a tertiary winding of said flyback transformer according to the voltage induced in the secondary winding based on the turns-ratio; and a screen voltage generator for receiving a second power source and a pulse width modulation signal, for controlling the voltage induced in the tertiary winding of said flyback transformer to maintain a uniform voltage level by selectively outputting the second power source in response to the pulse width modulation signal, and for outputting the voltage induced in the tertiary winding as a screen voltage;

said screen voltage generator comprising a screen voltage supply circuit for rectifying the voltage induced in the tertiary winding of said flyback transformer to output the voltage induced in the tertiary winding as the screen voltage, and a feedback resistance for controlling the screen voltage outputted from said screen voltage supply circuit to maintain the uniform voltage level; and said screen voltage generator further comprising a current restrictor for restricting current of an output voltage outputted from said feedback resistance in response to the pulse width modulation signal.

4. The circuit as claimed in claim 3, said screen voltage generator further comprising a constant-voltage switch for receiving the second power source, and for selectively outputting the second power source in response to the output voltage from said feedback resistance, of which the current is restricted by said current restrictor.

5. The circuit as claimed in claim 4, said screen voltage generator further comprising a voltage filter for filtering a negative voltage of an output voltage from said constant-voltage switch, and for outputting the output voltage from said constant-voltage switch to the tertiary winding of said flyback transformer.

6. The circuit as claimed in claim 5, said constant-voltage switch comprising a transistor having an emitter which receives the second power source, a collector connected to said voltage filter, and a base connected to said feedback resistance.

7. The circuit as claimed in claim 6, said transistor comprising a PNP transistor.

8. The circuit as claimed in claim 7, said voltage filter comprising:
a resistor having one end connected to the collector of said transistor and another end connected to another end of the tertiary winding of said flyback transformer; and
a capacitor having one end connected between said another end of said resistor and said another end of the tertiary winding, and another end grounded.

9. The circuit as claimed in claim 6, said voltage filter comprising:
a resistor having one end connected to the collector of said transistor and another end connected to another end of the tertiary winding of said flyback transformer; and
a capacitor having one end connected between the another end of said resistor and said another end of the tertiary winding, and another end grounded.

10. The circuit as claimed in claim 4, said feedback resistance comprising a plurality of resistors which are connected in series between said screen voltage supply circuit and said constant-voltage switch.

11. The circuit as claimed in claim 4, said current restrictor comprising:
a first resistor having one end connected between said feedback resistance and said constant-voltage switch;
a second resistor having one end connected to another end of said first resistor, and having another end grounded;
a third resistor having one end connected between said first resistor and said second resistor, and having another end receiving the pulse width modulation signal; and
a capacitor having one end connected to said one end of said third resistor, and having another end grounded.

12. A circuit for stabilizing a screen voltage of a video display apparatus, said apparatus comprising:
a horizontal output generator for generating a horizontal output voltage in response to a horizontal driving signal;
a flyback transformer having a primary winding to which a first power source is applied according to the horizontal driving signal, for inducing a voltage in a secondary winding of said flyback transformer based on a turns-ratio, and for inducing a voltage in a tertiary winding of said flyback transformer according to the voltage induced in the secondary winding based on the turns-ratio; and
a screen voltage generator for receiving a second power source and a pulse width modulation signal, for controlling the voltage induced in the tertiary winding o r said flyback transformer to maintain a uniform voltage level by selectively outputting the second power source in response to the pulse width modulation signal, and for outputting the voltage indicted in the tertiary winding as a screen voltage;

said screen voltage generator comprising a screen voltage supply circuit for rectifying he voltage induced in the tertiary winding of said flyback transformer to output the voltage induced in the tertiary winding as the screen voltage, and a feedback resistance for controlling the screen voltage outputted from said screen voltage supply circuit to maintain the uniform voltage level; and said screen voltage generator further comprising a constant-voltage switch for receiving the second power source, and for selectively outputting the second power source in response to the output voltage from said feedback resistance.

13. The circuit as claimed in claim 12, said screen voltage generator further comprising a voltage filter for filtering a negative voltage of an output voltage from said constant-voltage switch, and for outputting the output voltage from said constant-voltage switch to the tertiary winding of said flyback transformer.

14. The circuit as claimed in claim 13, said constant-voltage switch comprising a transistor having an emitter which receives the second power source, a collector connected to said voltage filter, and a base connected to said feedback resistance.

15. The circuit as claimed in claim 14, said transistor comprising a PNP transistor.

16. The circuit as claimed in claim 14, said voltage filter comprising:
a resistor having one end connected to the collector of said transistor and another end connected to another end of the tertiary winding of said flyback transformer; and
a capacitor having one end connected between said another end of said resistor and said another end of the tertiary winding, and another end grounded.

17. The circuit as claimed in claims 12, said feedback resistance comprising a plurality of resistors which are connected in series between said screen voltage supply circuit and said constant-voltage switch.

18. The circuit as claimed in claim 12, said screen voltage generator further comprising a current restrictor which includes:
a first resistor having one end connected between said feedback resistance and said constant-voltage switch;
a second resistor having one end connected to another end of said first resistor, and having another end grounded;
a third resistor having one end connected between said first resistor and said second resistor, and having another end receiving the pulse width modulation signal; and a capacitor having one end connected to said one end of said third resistor, and having another end grounded.

19. A circuit for stabilizing a screen voltage of a video display apparatus, said apparatus comprising:
- a horizontal output generator for generating a horizontal output voltage in response to a horizontal driving signal;
- a flyback transformer for supplying a first power source to a primary winding according to the horizontal driving signal, for inducing a voltage in a secondary winding thereof based on a turns-ratio, and for inducing a voltage in a tertiary winding thereof according to the voltage induced in the secondary winding based on the turns-ratio; and
- a screen voltage generator for receiving a second power source and a pulse width modulation signal, for controlling the voltage induced in the tertiary winding of said flyback transformer to maintain a uniform voltage level by selectively outputting the second power source in response to the pulse width modulation signal, and for outputting the voltage induced in the tertiary winding as a screen voltage;

said screen voltage generator comprising:
- a screen voltage supply circuit for rectifying the voltage induced in the tertiary winding of said flyback transformer to output the voltage induced in the tertiary winding as the screen voltage;
- a feedback resistance for controlling the screen voltage outputted from said screen voltage supply circuit to maintain the uniform voltage level;
- a constant-voltage switch for receiving the second power source, and for selectively outputting the second power source in response to the output voltage from said feedback resistance; and
- a voltage filter for filtering a negative voltage of an output voltage from said constant-voltage switch, and for outputting the output voltage from said constant-voltage switch to the tertiary winding of said flyback transformer;
- said voltage filter comprising a resistor having one end connected to said constant-voltage switch and another end connected to the tertiary winding of said flyback transformer, and a capacitor having one end connected between said another end of said resistor and said tertiary winding, and another end grounded.

20. A circuit for stabilizing a screen voltage of a video display apparatus, said apparatus comprising:
- a horizontal output generator for generating a horizontal output voltage in response to a horizontal driving signal;
- a flyback transformer for supplying a first power source to a primary winding according to the horizontal driving signal, for inducing a voltage in a secondary winding thereof based on a turns-ratio, and for inducing a voltage in a tertiary winding thereof according to the voltage induced in the secondary winding based on the turns-ratio; and
- a screen voltage generator for receiving a second power source and a pulse width modulation signal, for controlling the voltage induced in the tertiary winding of said flyback transformer to maintain a uniform voltage level by selectively outputting the second power source in response to the pulse width modulation signal, and for outputting the voltage induced in the tertiary winding as a screen voltage;

said screen voltage generator comprising:
- a screen voltage supply circuit for rectifying the voltage induced in the tertiary winding of said flyback transformer to output the voltage induced in the tertiary winding as the screen voltage;
- a feedback resistance for controlling the screen voltage outputted from said screen voltage supply circuit to maintain the uniform voltage level;
- a current restrictor for restricting current of an output voltage outputted from said feedback resistance in response to the pulse width modulation signal; and
- a constant-voltage switch for receiving the second power source, and for selectively outputting the second power source in response to the output voltage from said feedback resistance, of which the current is restricted by said current restrictor;
- said current restrictor comprising a first resistor having one end connected between said feedback resistance and said constant-voltage switch, a second resistor having one end connected to another end of said first resistor and having another end grounded, a third resistor having one end connected between said first resistor and said second resistor, and having another end receiving the pulse width modulation signal, and a capacitor having one end connected to said one end of said third resistor, and having another end grounded.

* * * * *